US012622411B2

(12) United States Patent
Yang

(10) Patent No.: US 12,622,411 B2
(45) Date of Patent: May 12, 2026

(54) DETACHABLE CAT CLIMBING FRAME

(71) Applicant: Zhejiang Hengfeng Top Leisure Co., Ltd., Zhejiang Province (CN)

(72) Inventor: Baoqing Yang, Wukang Town (CN)

(73) Assignee: Zhejiang Hengfeng Top Leisure Co., Ltd., Zhejiang (CN)

( * ) Notice: Subject to any disclaimer, the term of this patent is extended or adjusted under 35 U.S.C. 154(b) by 0 days.

(21) Appl. No.: 18/964,946

(22) Filed: Dec. 2, 2024

(65) Prior Publication Data

US 2025/0176495 A1 Jun. 5, 2025

(30) Foreign Application Priority Data

Dec. 4, 2023 (CN) .......................... 202323292264.2

(51) Int. Cl.
*A01K 1/035* (2006.01)
*A01K 15/02* (2006.01)
(52) U.S. Cl.
CPC ............ *A01K 1/035* (2013.01); *A01K 15/025* (2013.01)
(58) Field of Classification Search
CPC .... A01K 15/02; A01K 15/025; A01K 15/024; A01K 1/035; A01K 1/033
See application file for complete search history.

(56) References Cited

U.S. PATENT DOCUMENTS

| | | | | |
|---|---|---|---|---|
| 8,020,518 B1 * | 9/2011 | Reinke | ................... | A01K 1/035 |
| | | | | 119/482 |
| 8,695,533 B1 * | 4/2014 | Mulligan | ............... | A01K 1/035 |
| | | | | 119/28.5 |
| D942,093 S * | 1/2022 | Huang | ......................... | D30/160 |
| 2010/0154719 A1 * | 6/2010 | Kellogg | ............... | A01K 15/024 |
| | | | | 119/702 |
| 2012/0312239 A1 * | 12/2012 | Wedertz | ............... | A01K 15/024 |
| | | | | 119/28.5 |
| 2014/0033987 A1 * | 2/2014 | Hoffman | ................ | A01K 1/035 |
| | | | | 119/706 |
| 2019/0230896 A1 * | 8/2019 | Goldman | ............... | A01K 1/035 |
| 2021/0400915 A1 * | 12/2021 | Monahan | ............. | A01K 15/024 |
| 2023/0059223 A1 * | 2/2023 | Cui | ......................... | A01K 15/02 |

FOREIGN PATENT DOCUMENTS

| | | | | | |
|---|---|---|---|---|---|
| KR | 20230101075 A | * | 7/2023 | ........... | A01K 15/025 |

\* cited by examiner

*Primary Examiner* — Trinh T Nguyen
(74) *Attorney, Agent, or Firm* — Thompson Coburn LLP

(57) ABSTRACT

A detachable cat climbing frame includes pillars, a partition, and an end connector. The end connector includes a male connector and a female connector. End of the pillars are releasably connectable together to form the end connector. The pillars have the male connector disposed in an end of the pillar. Using the end connector, pillars are connectable end to end in a first configuration, a pillar is connectable with the partition in second configuration, and/or pillars are connectable end to end with the partition therebetween in a third configuration, thereby allowing a modular design for the frame, which allows free combination, diverse structures, and unified connection methods that are convenient, quick and reduce or eliminate the need for additional tools.

19 Claims, 9 Drawing Sheets

CF

CF

14

2

14

14

2

14

14

17

13

DETACHABLE CAT CLIMBING FRAME

RELATED APPLICATION DATA

This application claims priority benefit to Chinese utility model application serial no. CN 202323292264.2 filed Dec. 4, 2023, the disclosure of which is incorporated by reference herein.

TECHNICAL FIELD

The present disclosure relates to the field of pet appliances, and more specifically to a quick-detachable cat climbing frame.

BACKGROUND ART

A cat climbing frame is a type of pet appliance. Typically, it is a small multi-layer frame structure, with the main function of providing a space for pet cats to play, exercise, and rest. Currently, cat climbing frames on the market are generally single cat climbing frames, which are formed by combining a base plate and pillars and mounting different components on the pillars. Moreover, using overlapping methods enhances the functionality of the cat climbing frame and thus forms a large cat climbing frame.

Cat climbing frames on the market mainly use double-head hardware bolts to connect pillars, which requires a wrench for mounting. Hardware bolts involve numerous rotations, making assembly and disassembly difficult and mounting efficiency low. Additionally, the dimensions and structures of the pillars are not uniform, which requires users to refer to instruction manuals and pillar labels during mounting, often resulting in incorrect assembly.

SUMMARY

To address the above technical issues, the objective of the present disclosure is to provide a quick-detachable cat climbing frame, where the cat climbing frame is easy to assemble, highly efficient to mount, diverse in form, and highly entertaining.

In order to achieve the above objective of the present disclosure, the technical solution adopted by the present disclosure follows below in more detail.

A quick-detachable cat climbing frame is provided, including pillars, a partition, and an end connector. The end connector includes a male connector and a female connector. The male connector and the female connector are fixed by means of threads, clamping blocks, magnets, or sockets. The end parts of two adjacent pillars are respectively connected through the male connector and the female connector to form a first unit. The pillar and the partition are also connected through the male connector and the female connector to form a second unit. The partition is clamped between two fixed pillars to form a third unit. Any combination of the first unit, the second unit, and the third unit mentioned above forms at least a part of the cat climbing frame.

As a preferred solution, a short partition is further included. The pillar and the short partition may be connected through the male connector and the female connector to form a fourth unit. The short partition may be clamped between two fixed pillars to form a fifth unit. Any combination of the first unit, the second unit, the third unit, the fourth unit, and the fifth unit above may form the cat climbing frame.

As a preferred solution, the male connector is a threaded socket, and the female connector is a single-head screw cap. The threaded socket is embedded in at least one end of the pillar. The single-head screw cap passes through the partition and/or the short partition and is fastened to the threaded socket, so as to fix the partition and/or the short partition to the pillar.

As a preferred solution, a spherical wrench configured for tightening or loosening the single-head screw cap is further included. The spherical wrench may be suspended on the partition and/or the short partition.

As a preferred solution, the male connector is a threaded socket, and the female connector is a double-head screw. The threaded socket is embedded in at least one end of the pillar, and the double-head screw is fastened to the threaded sockets at the end parts of the two pillars.

As a preferred solution, a wooden ring is sleeved in a middle of the double-head screw, or the middle of the double-head screw is inserted into the partition and/or the short partition.

As a preferred solution, a cat teaser ball is further included. The cat teaser ball may be suspended on the partition and/or the short partition.

As a preferred solution, a climbing ladder is further included. The climbing ladder may be connected to the partition and/or the short partition through a hinge.

As a preferred solution, a cat house is further included. The pillar may be fixed to an upper plate and/or a lower plate of the cat house through the end connector.

As a preferred solution, a lookout platform and a base plate are further included. The lookout platform may be fixed to a top of an upper pillar, and the base plate may be fixed to a bottom of a lower pillar.

Compared with the prior art, the present disclosure includes the following beneficial effects: The present disclosure forms a modular unit design by means of pillar and pillar, pillar and partition, and two pillars clamping the partition, allowing free combination, diverse structures, and uniform connection methods for each pillar without the need to distinguish positions, so as to solve the problem that users are easy to mount incorrectly. Additionally, components of each modular unit are connected through the cooperation of the male connector and the female connector, and the male connector and the female connector are fixed by means of threads, clamping blocks, magnets, or sockets, thus providing convenient and quick operation, helping to reduce or eliminate the use of additional tools.

BRIEF DESCRIPTION OF DRAWINGS

The drawings depicted herein, constituting a part of the present disclosure, are provided to offer a further understanding of the present disclosure. The illustrative embodiments and their descriptions are used to explain the present disclosure and do not constitute limitations on the present disclosure.

Figure 1:
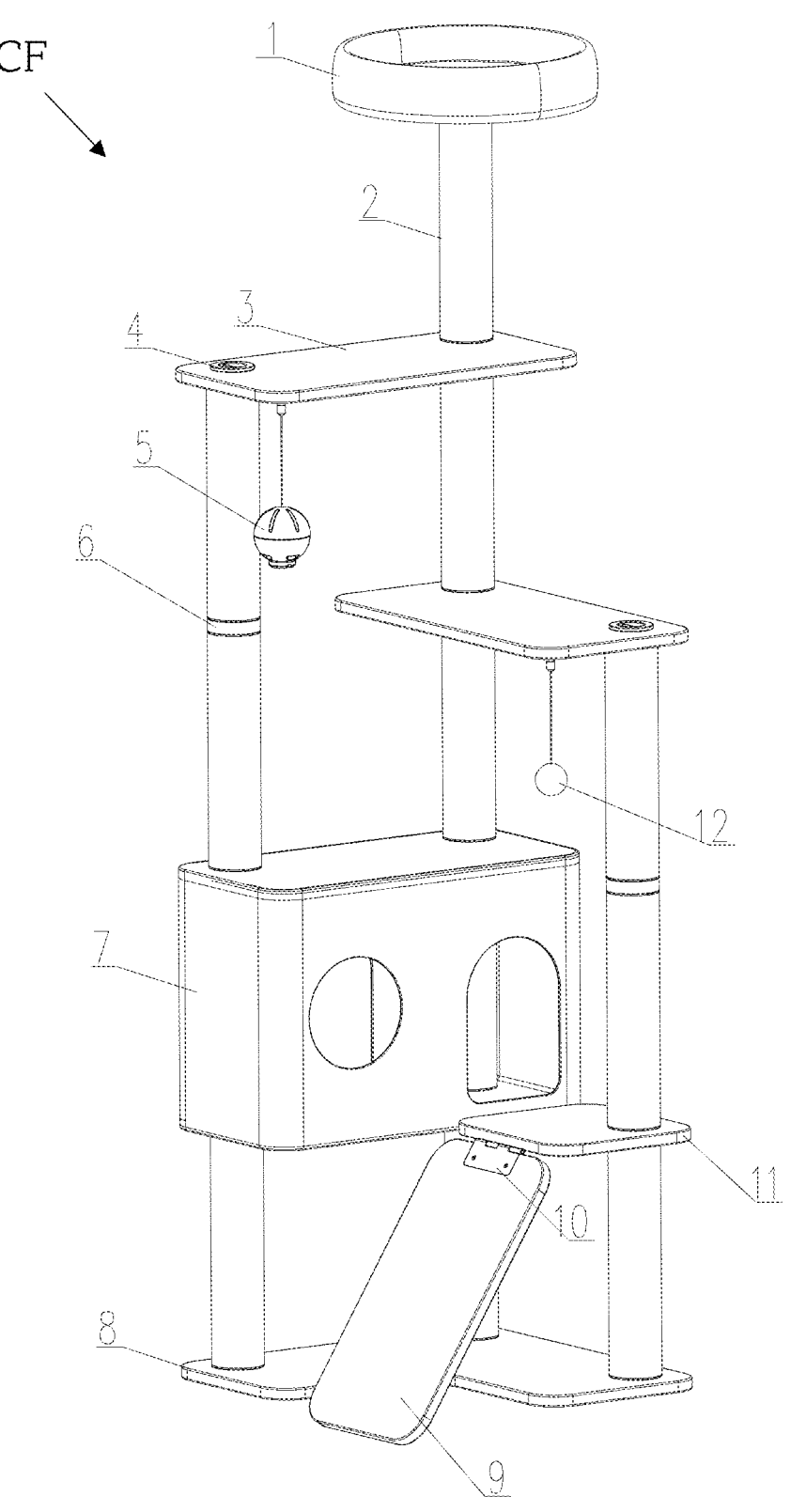
FIG. 1 is a schematic diagram of an overall structure after assembly in accordance with the present disclosure.

Reference numerals: 1, lookout platform; 2, pillar; 3, partition; 4, single-head screw cap; 5, spherical wrench; 6, wooden ring; 7, cat house; 8, base plate; 9, climbing ladder; 10, hinge; 11, short partition; 12, cat teaser ball; 13, double-head screw; 14, threaded socket; 15, insert A; and 16, insert B.

DETAILED DESCRIPTION OF EMBODIMENTS

It should be noted that the following detailed description is illustrative and aims to provide further explanation of the present disclosure. Unless otherwise specified, all technical and scientific terms used herein have the same meanings as commonly understood by those of ordinary skill in the art to which the present disclosure belongs.

It should be noted that the terminology used herein is intended to describe specific embodiments only and is not intended to limit exemplary embodiments according to the present disclosure. As used herein, the singular form is also intended to encompass the plural form unless the context clearly dictates otherwise, and it should also be understood that when used in the summary, the terms "comprise" and/or "include" indicate the presence of features, steps, operations, devices, components and/or combinations thereof.

Moreover, in the description of the present disclosure, it is to be understood that the terms "center", "longitudinal", "lateral", "length", "width", "thickness", "top", "bottom", "front", "back", "left", "right", "vertical", "horizontal", "top", "bottom", "inside", "clockwise", "counterclockwise", etc., indicate orientations or positional relationships based on those shown in the drawings, and are intended only to facilitate the description of the present disclosure and to simplify the description, and are not intended to indicate or imply that the device or component referred to must have a particular orientation, be constructed and operated in a particular orientation, and therefore cannot be construed as a limitation of the present disclosure.

Additionally, the terms "first" and "second" are used for descriptive objectives only and should not be understood as indicating or implying relative importance or specifying the quantity of the indicated technical features. Consequently, features labeled with "first" or "second" can explicitly or implicitly include one or more of those features. In the description of the present disclosure, unless otherwise indicated, "multiple" means two or more, unless otherwise explicitly specified.

In the present disclosure, unless otherwise clearly stipulated and limited, the terms "mount", "connect", "link", "fix" and so on should be understood in a broad sense, for example, it can be a fixed connection, a detachable connection, or an integral connection; it can be a mechanical connection or an electrical connection; and it can be a direct connection, an indirect connection through an intermediary, or an internal communication between two components. Those of ordinary skill in the art can understand the meanings of the above terms in the present disclosure according to specific situations.

In the present disclosure, unless otherwise expressly specified and limited, a first feature being above or below a second feature may include that the first and second features are in direct contact; it can also be included that the first and second features are not in direct contact but are in contact through another feature therebetween. Moreover, the first feature being "on", "over", and "above" the second feature includes that the first feature is directly above and obliquely above the second feature, or simply means that the first feature is horizontally higher than the second feature. The first feature being "under", "below", and "at the bottom of" the second feature includes that the first feature is directly below and obliquely below the second feature, or simply means that the first feature has a lower level than the second feature.

The present disclosure is further described below in conjunction with the drawings and the embodiments.

As shown in FIG. 1, a quick-detachable cat climbing frame CF includes a pillar 2, a partition 3, a short partition 11, and an end connector. The end connector includes a male connector and a female connector. The male connector and the female connector are fixed by means of threads, clamping blocks, magnets, or sockets. All the fixing methods above can be operated manually, thus providing convenient and quick operation without the need for additional tools. End parts of two pillars 2 respectively may be connected through the male connector and the female connector to form a first unit. In addition to or alternative, the pillar 2 and the partition 3 may be connected through the male connector and the female connector to form a second unit. In addition to or alternative, the partition 3 may be clamped between two fixed pillars 2 to form a third unit. In addition to or alternative, the pillar 2 and the short partition 11 may be connected through the male connector and the female connector to form a fourth unit. In addition to or alternative, the short partition 11 may be clamped between two fixed pillars 2 to form a fifth unit. Any combination of the first unit, the second unit, the third unit, the fourth unit, and the fifth unit above may be used to form the cat climbing frame CF.

The cat climbing frame CF of the present disclosure may use only one of the above five unit structures, any combination of two of the five unit structures, any combination of three of the five unit structures, any combination of four of the five unit structures, or a combination of all five unit structures. In each combination, the number of unit structures is not limited and can be set according to the available space and specific needs.

In the preferred embodiment, a modular unit design is adopted. Each unit can be easily and freely combined through the end connectors to form a cat climbing frame with diverse structures, thus enhancing the entertainment value. Additionally, the components of each modular unit may be connected through the cooperation of the male connector and the female connector. The male connector and the female connector may be fixed by means of threads, clamping blocks, magnets, sockets, or plug-in methods, thus ensuring convenient and quick operation without requiring additional tools.

The specific connection structures of the male connector, the female connector, and each unit are as described below in more detail.

Figure 2:
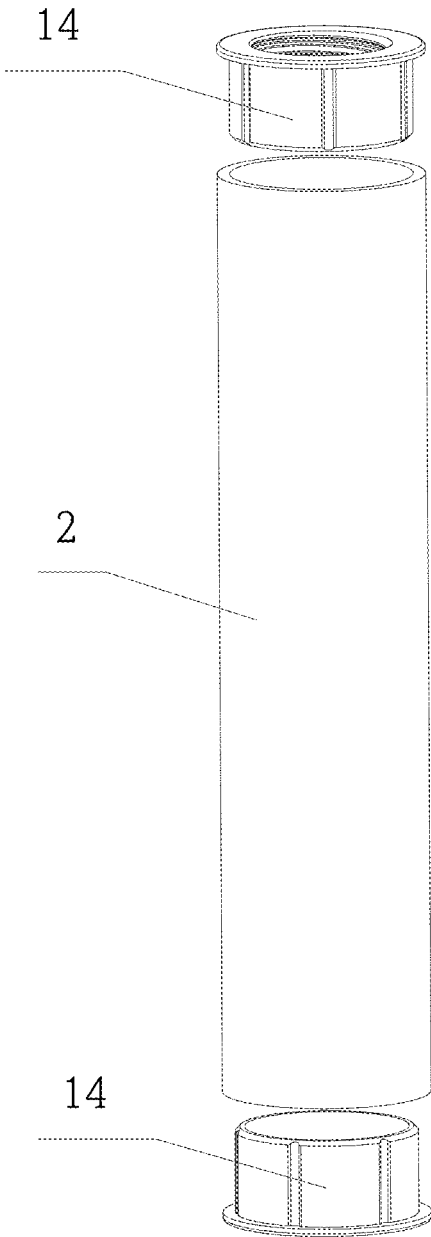
FIG. 2 is an exploded perspective view a mounting of a pillar and threaded sockets in accordance with the present disclosure.
Figure 3:
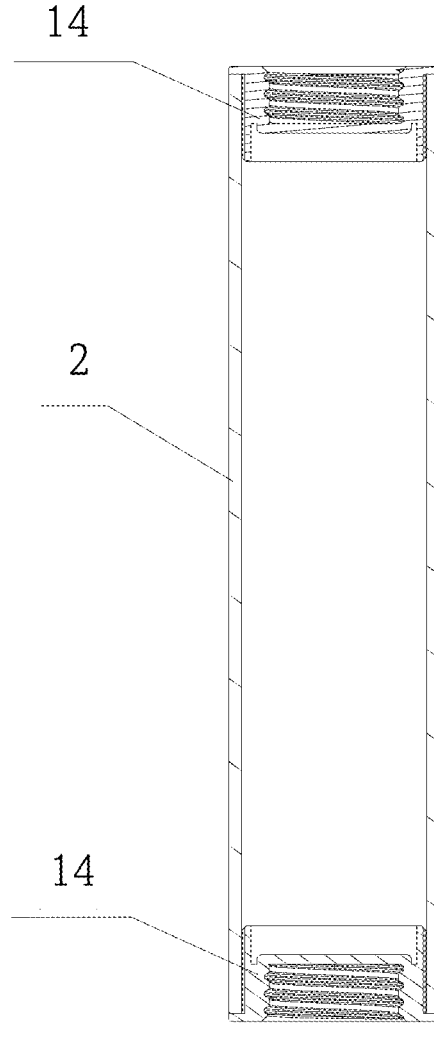
FIG. 3 is a cross sectional view of a pillar and threaded sockets mounted in the pillar in accordance with the present disclosure.
Figure 5:
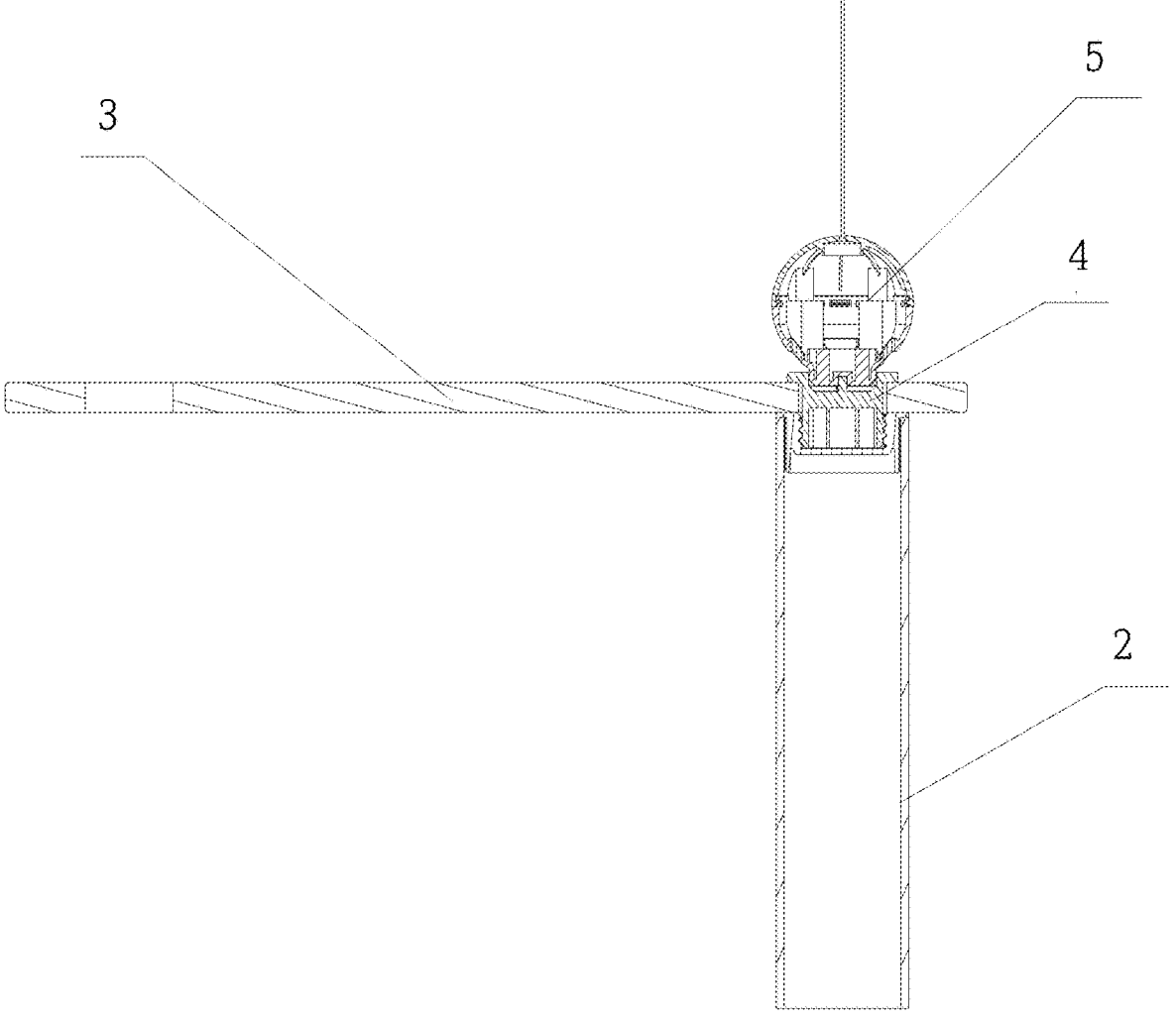
FIG. 5 is a cross-sectional view of a pillar, a partition, a single-head screw cap, and a spherical wrench in accordance with the present disclosure.

As best shown in FIGS. 2 and 3, the male connector is a threaded socket 14, and as best shown in FIG. 5, the female connector is a single-head screw cap 4. The threaded socket 14 is embedded in at least one end of the pillar 2. The single-head screw cap 4 passes through the partition 3 and/or the short partition 11 and is fastened to the threaded socket 14 to fix the partition 3 and/or the short partition 11 to the pillar 2, thus forming the second unit or the fourth unit.

Figure 4:
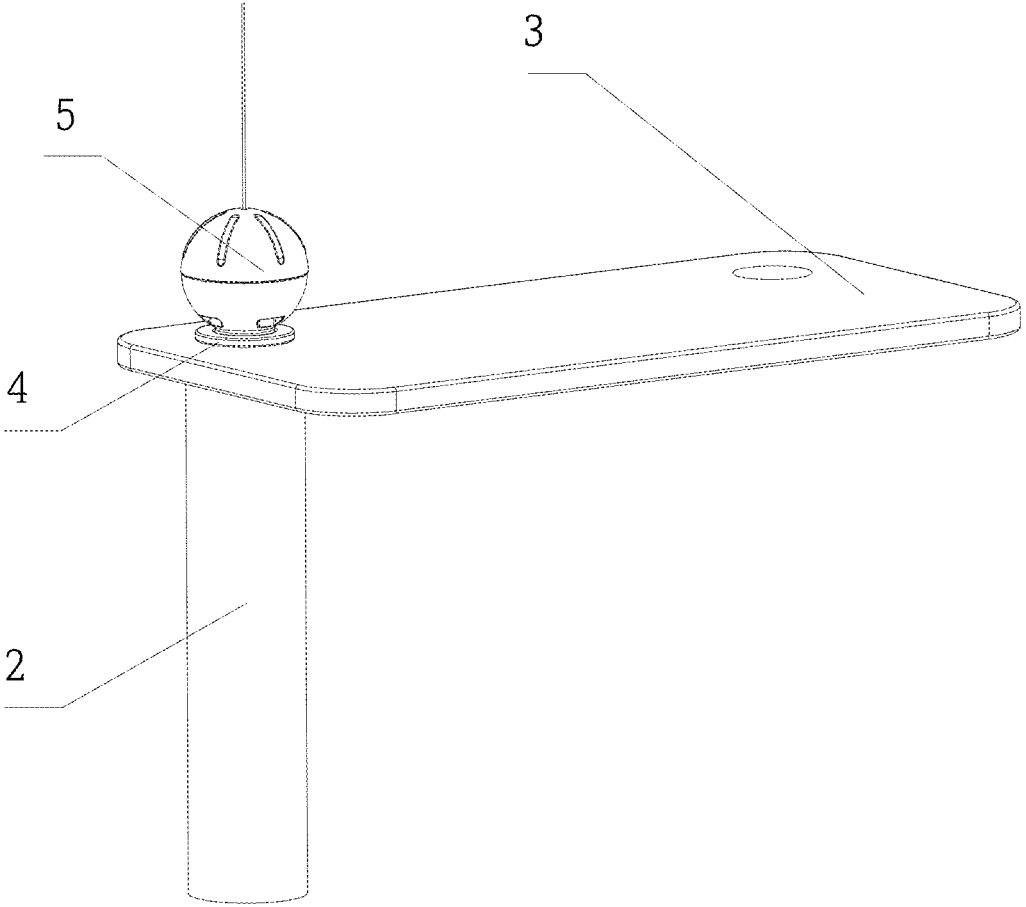
FIG. 4 is a perspective view showing disassembly or assembly of a pillar and a partition by using a spherical wrench to loosen or tighten, as applicable, a single-head screw cap in accordance with the present disclosure.

As shown in FIGS. 4 and 5, a spherical wrench 5 configured for tightening or loosening the single-head screw cap 4 is further included. The spherical wrench 5 may be suspended on the partition 3 and/or the short partition 11. The spherical wrench can replace additional mounting tools. The spherical wrench may contain a built-in bell, and may also serve as a decorative item for entertaining cats. Thus, the spherical wrench serves multiple purposes.

Figure 6:
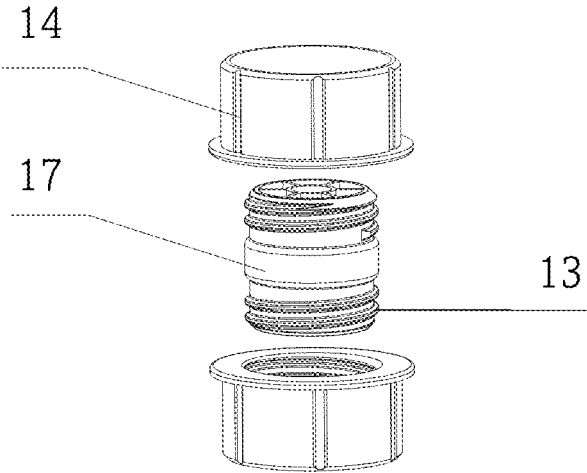
FIG. 6 is a perspective view of a connection between a double-head screw and two threaded sockets in accordance with the present disclosure.
Figure 7:
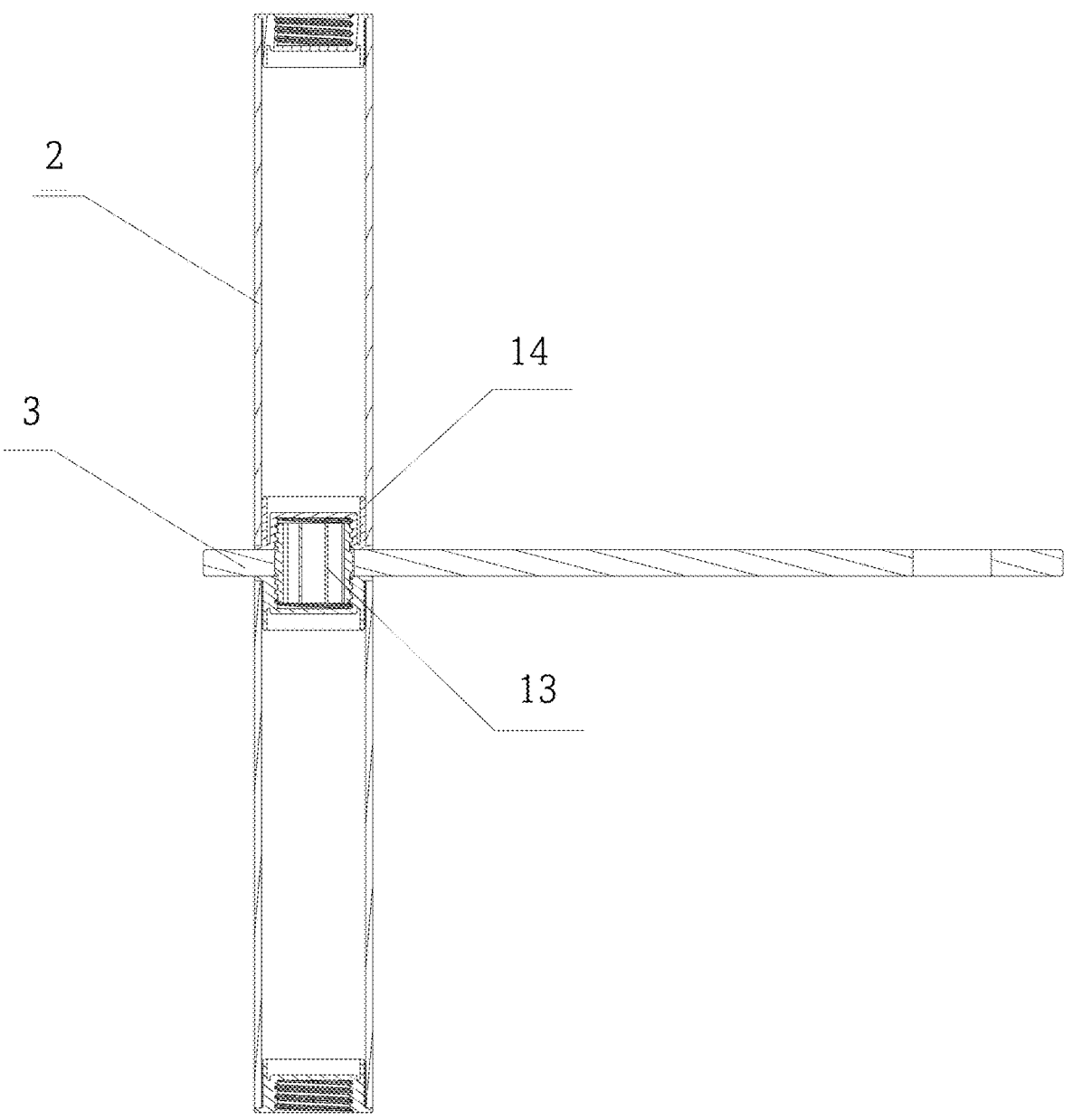
FIG. 7 is a cross-sectional view of a mounting of two pillars and a partition in accordance with the present disclosure.
Figure 8:
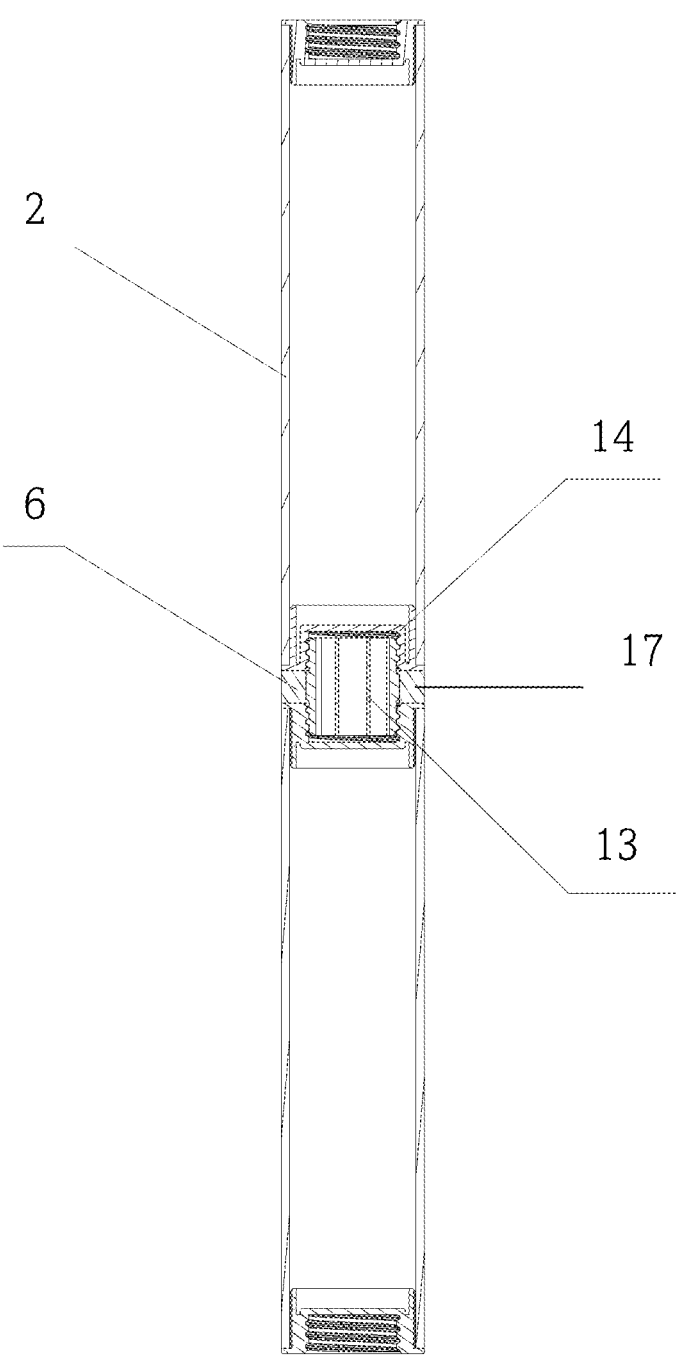
FIG. 8 is a cross-sectional view of a mounting of two pillars in accordance with the present disclosure.

As shown in FIGS. 6 to 8, the male connector is a threaded socket 14, and the female connector may be a double-head screw 13. The threaded socket 14 is embedded in at least one end of the pillar 2. The double-head screw 13 is fastened to the threaded sockets 14 at the end parts of two pillars 2 to form the first unit. A wooden ring 17 may be sleeved at the middle of the double-headed screw 13, thus maintaining a consistent overall appearance between adjacent pillars 12.

The middle of the double-headed screw 13 may be inserted into the partition 3 and/or the short partition 11. Each end of the double-headed screw 13 may be fastened to one of the two pillars 12, thus forming the third unit or the fifth unit.

In the preferred embodiment, the components adopt a standardized design which follows below in more detail. Threaded sockets 14 are mounted at both ends of the pillar 12 to ensure a unified connection method for each pillar, and the lengths of the pillars are uniform, thus forming a standardized part. During mounting, there is no need to distinguish positions or among pillars, thereby reducing the risk of user error during assembly.

Figure 9:
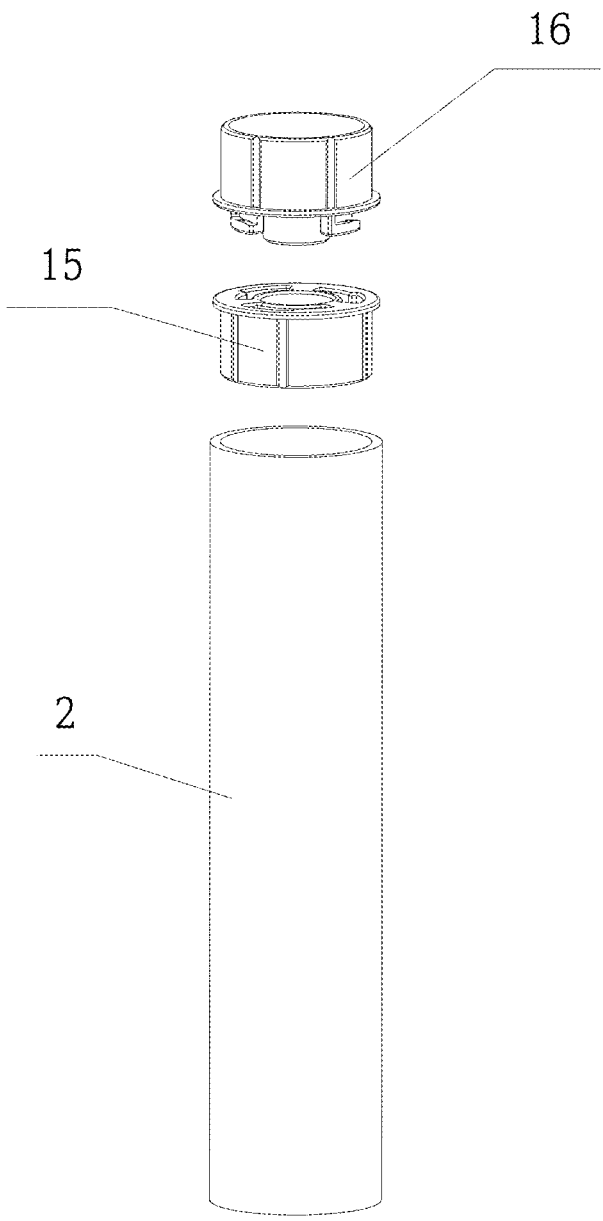
FIG. 9 is a perspective view of a mounting of a pillar with an insert A and an insert B in accordance with the present disclosure.

As best shown in FIG. 9, the male connector and the female connector of the present disclosure can also be a first insert 15 and a second insert 16. The upper end surface of first insert 15 is provided with a recess, and the lower end surface of second insert 16 is provided with a clamping block. The first and second inserts 15,16 are respectively fixed at the end parts of the two pillars. The first and second inserts 15,16 are fixed through the cooperation of the clamping block and the recess, and the friction force after the deformation of the plastic part achieves the effect of tightening the assembly.

Referring to FIG. 1, the cat climbing frame CF further includes a cat teaser ball 12. The cat teaser ball 12 may be suspended on the partition 3 and/or the short partition 11. The cat climbing frame CF may further include a climbing ladder 9. The climbing ladder 9 may be connected to the partition 3 and/or the short partition 11 through a hinge 10. The cat climbing frame CF may further include a cat house 7. The pillar 2 may be fixed to an upper plate and/or a lower plate of the cat house 7 through the end connector. The cat climbing frame CF may further includes a lookout platform 1, and may further include a base plate 8. The lookout platform 1 may be fixed to a top of an upper pillar 2. The base plate 8 may be fixed to a bottom of a lower pillar 2.

In the present disclosure, the single-headed screw cap 4 and the double-headed screw 13 are connected to the threaded socket 14 that is pre-fixed inside the pillar. This reduces the number of tightening rotations, improving mounting efficiency, and solving the problem of complex user assembly. The single-headed screw cap 4 and the double-headed screw 13 of the present disclosure may be both made of plastic material. Users can directly tighten them by hand without requiring additional tools to achieve the mounting.

In the description of the summary, reference terms such as "an embodiment", "some embodiments", "an example", "specific examples", or "some examples" in the description refer to one or more embodiments or examples of the present disclosure that include specific features, structures, materials, or characteristics described in conjunction with that embodiment or example. In the summary, the illustrative expressions for the terms above do not necessarily refer to the same embodiment or example. Moreover, specific features, structures, materials, or characteristics described can be appropriately combined in any one or more embodiments or examples.

Although the embodiments of the present disclosure have been shown and described above, it is understood that the embodiments are exemplary and should not be construed as limiting the present disclosure. Those skilled in the art may make variations, modifications, substitutions, and alterations to the above embodiments within the scope of the present disclosure without departing from the principles and spirit of the present disclosure. Any simple modifications, equivalent changes, or adaptations made to the above embodiments based on the technical essence of the present disclosure shall still fall within the scope of the technical solutions of the present disclosure.

The invention claimed is:

1. A detachable cat climbing frame comprising:
   at least two pillars;
   a partition; and
   an end connector, the end connector comprising a male connector and a female connector, the male connector and the female connector being releasably connectable together to form the end connector;
   wherein the at least two pillars each have the male connector disposed in an end of the pillar, wherein the male connector is a threaded socket;
   wherein the female connector comprises a single head screw cap;
   wherein the cat climbing frame is configurable in at least one of a first, second, third and fourth configuration;
   wherein in the first configuration, the cat climbing frame is arranged with the at least two pillars aligned end to end and connected together with the female connector connecting to the male connector disposed in the end of each of the at least two pillars;
   wherein in the second configuration, the cat climbing frame is arranged with one of the at least two pillars connected to the partition with the female connector connecting to the male connector disposed in the end of the one of the at least two pillars;
   wherein in the third configuration, the cat climbing frame is arranged with the at least two pillars aligned end to end and connected together with the female connector connecting to the male connector disposed in the end of each of the at least two pillars with the partition fixed between the ends of the at least two pillars connected together with the female connector;
   wherein in the fourth configuration, the cat climbing frame is arranged with another of the at least two pillars connected to the further partition with the female connector connecting to the male connector disposed in the end of the another of the at least two pillars;
   wherein in the second configuration, the single head screw cap passes through the partition and is fastened to the threaded socket in a manner so as to fix the partition to the one of the at least two pillars; and wherein in the fourth configuration, the single head screw cap passes through the further partition and is fastened to the threaded socket in a manner so as to fix the further partition to the another of the at least two pillars.

2. The detachable cat climbing frame according to claim 1, further comprising a spherical wrench configured for tightening and loosening the single-head screw cap.

3. The detachable cat climbing frame according to claim 2, wherein in the second configuration, the spherical wrench is suspended from the partition;

wherein in the fourth configuration, the spherical wrench is suspended from the further partition.

4. A detachable cat climbing frame comprising:

at least two pillars;

a partition; and an end connector, the end connector comprising a male connector and a female connector, the male connector and the female connector being releasably connectable together to form the end connector;

wherein the at least two pillars each have the male connector disposed in an end of the pillar, wherein the male connector is a threaded socket;

wherein the female connector comprises a double head screw cap;

wherein the cat climbing frame is configurable in at least one of a first, second, third and fourth configuration;

wherein in the first configuration, the cat climbing frame is arranged with the at least two pillars aligned end to end and connected together with the female connector connecting to the male connector disposed in the end of each of the at least two pillars;

wherein in the second configuration, the cat climbing frame is arranged with one of the at least two pillars connected to the partition with the female connector connecting to the male connector disposed in the end of the one of the at least two pillars;

wherein in the third configuration, the cat climbing frame is arranged with the at least two pillars aligned end to end and connected together with the female connector connecting to the male connector disposed in the end of each of the at least two pillars with the partition fixed between the ends of the at least two pillars connected together with the female connector;

wherein in the fourth configuration, the cat climbing frame is arranged with the at least two pillars aligned end to end and connected together with the female connector connecting to the male connector disposed in the end of each of the at least two pillars with the further partition fixed between the ends of the at least two pillars connected together with the female connector;

wherein in the first configuration, each end of the double head screw cap connects to the male connector disposed in the end of each of the at least two pillars;

wherein in the third configuration, each end of the double head screw cap connects to the male connector disposed in the end of each of the at least two pillars with the partition fixed between the ends of the at least two pillars; and wherein in the fourth configuration, each end of the double head screw cap connects to the male connector disposed in the end of each of the at least two pillars with the further partition fixed between the ends of the at least two pillars.

5. The detachable cat climbing frame according to claim 4, wherein a ring is sleeved around a center of the double head screw cap.

6. The detachable cat climbing frame according to claim 5, wherein in the third configuration, the ring is configured to be received in a hole formed in the partition; and wherein in the fourth configuration, the ring is configured to be received in a hole formed in the further partition.

7. The detachable cat climbing frame according to claim 5, wherein the ring has an exterior appearance that matches an exterior appearance of the at least two pillars.

8. The detachable cat climbing frame according to claim 4, further comprising a cat teaser ball;

wherein in the third configuration, the cat teaser ball is suspended from the partition; and wherein in the fourth configuration, the cat teaser ball is suspended from the further partition.

9. The detachable cat climbing frame according to claim 4, further comprising a climbing ladder;

wherein in the third configuration, the climbing ladder is connected to the partition; and wherein in the fourth configuration, the climbing ladder is connected to the further partition.

10. The detachable cat climbing frame according to claim 4, further comprising at least one of a cat house connected to one of the at least two pillars with the end connector, and a lookout platform connected to an upper end one of the at least two pillars with the end connector.

11. The detachable cat climbing frame according to claim 4, further comprising a base plate connected to a bottom end one of the at least two pillars with end connecting member.

12. The detachable cat climbing frame according to claim 4, further comprising an object suspended from the frame, the suspended object being a pet interest item.

13. The detachable cat climbing frame according to claim 12, wherein the suspended object is configured as a tool configured for removing and installing at least one of the male connector and the female connector in the end of the pillar.

14. The detachable cat climbing frame according to claim 13, wherein the suspended object is configured as a wrench.

15. The detachable cat climbing frame according to claim 1, further comprising at least one of a cat house connected to one of the at least two pillars with the end connector, and a lookout platform connected to an upper end one of the at least two pillars with the end connector.

16. The detachable cat climbing frame according to claim 1, further comprising a base plate connected to a bottom end one of the at least two pillars with end connecting member.

17. The detachable cat climbing frame according to claim 1, further comprising an object suspended from the frame, the suspended object being a pet interest item.

18. The detachable cat climbing frame according to claim 17, wherein the suspended object is configured as a tool configured for removing and installing at least one of the male connector and the female connector in the end of the pillar.

19. The detachable cat climbing frame according to claim 17, wherein the suspended object is configured as a wrench.

* * * * *